(12) United States Patent
Dean et al.

(10) Patent No.: US 9,747,347 B1
(45) Date of Patent: *Aug. 29, 2017

(54) PROVIDING POSTS FROM AN EXTENDED NETWORK

(71) Applicant: Google Inc., Mountain View, CA (US)

(72) Inventors: Jeffrey Adgate Dean, Palo Alto, CA (US); Sanjay Ghemawat, Mountain View, CA (US); Sachin Jain, Milpitas, CA (US); Boris Mazniker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 14/476,133

(22) Filed: Sep. 3, 2014

Related U.S. Application Data (63) Continuation of application No. 13/658,570, filed on Oct. 23, 2012, now Pat. No. 8,856,141.

(60) Provisional application No. 61/576,067, filed on Dec. 15, 2011.

(51) Int. Cl.
*G06F 17/30* (2006.01)
*H04L 12/18* (2006.01)

(52) U.S. Cl.
CPC ...... *G06F 17/3053* (2013.01); *H04L 12/1813* (2013.01)

(58) Field of Classification Search
USPC ................. 707/723, 748, 749, 780
See application file for complete search history.

(56) References Cited

U.S. PATENT DOCUMENTS

| 7,904,511 | B2 * | 3/2011 | Ryan | G06Q 50/01 709/204 |
| 8,086,605 | B2 | 12/2011 | Xu et al. | |
| 8,375,024 | B2 | 2/2013 | Goeldi | |
| 8,521,734 | B2 | 8/2013 | Walther et al. | |
| 8,688,701 | B2 | 4/2014 | Ghosh et al. | |
| 8,949,239 | B2 * | 2/2015 | Ruffner | 707/738 |
| 2007/0214121 | A1 * | 9/2007 | Ebanks | G06F 17/30867 |
| 2008/0140650 | A1 * | 6/2008 | Stackpole | G06F 17/3087 |
| 2009/0249451 | A1 * | 10/2009 | Su | G06F 17/30867 726/5 |
| 2010/0169327 | A1 * | 7/2010 | Lindsay | H04L 12/58 707/750 |
| 2010/0241755 | A1 * | 9/2010 | Bassett | G06Q 10/10 709/229 |

(Continued)

*Primary Examiner* — Cam-Linh Nguyen
(74) *Attorney, Agent, or Firm* — Patent Law Works LLP (57) ABSTRACT

A system includes: an engaging post identifier for identifying and retrieving engaging posts; an extended network post identifier for identifying extended posts from an extended network; a combining module for creating a combined list of added posts from the engaging post and the extended posts, the combining module generating one or more ranked posts by ranking the list of added posts by relevance to a user; and a user interface module for providing the one or more ranked posts. The disclosure also includes a method for finding and providing engaging posts that includes determining engaging posts; determining extended posts from an extended social network using a social graph of the user; adding the engaging posts and the extended posts to create a combined list of added posts; ranking the added posts by relevance to a user; and providing one or more of the ranked posts.

21 Claims, 6 Drawing Sheets

(56) References Cited

U.S. PATENT DOCUMENTS

| | | |
|---|---|---|
| 2010/0287033 A1* | 11/2010 | Mathur ............ G06F 17/30867 705/319 |
| 2011/0196855 A1 | 8/2011 | Wable et al. |
| 2011/0213785 A1 | 9/2011 | Kristiansson et al. |
| 2011/0231296 A1 | 9/2011 | Gross et al. |
| 2011/0238763 A1* | 9/2011 | Shin ...................... G06Q 10/10 709/206 |
| 2011/0307494 A1 | 12/2011 | Snow |
| 2012/0110088 A1 | 5/2012 | Su et al. |
| 2012/0110096 A1 | 5/2012 | Smarr et al. |
| 2012/0117059 A1 | 5/2012 | Bailey et al. |
| 2012/0166452 A1 | 6/2012 | Tseng |
| 2012/0179958 A1* | 7/2012 | Tarjan ................ G06F 17/2247 715/234 |
| 2013/0046770 A1 | 2/2013 | Tseng |
| 2013/0073568 A1* | 3/2013 | Federov ............ G06F 17/30867 707/749 |
| 2013/0073979 A1* | 3/2013 | Shepherd ............... G06Q 50/01 715/744 |
| 2013/0080592 A1* | 3/2013 | Budd ..................... G06Q 30/02 709/219 |
| 2013/0097180 A1 | 4/2013 | Tseng |
| 2013/0138662 A1 | 5/2013 | He et al. |

* cited by examiner

PROVIDING POSTS FROM AN EXTENDED NETWORK

CROSS REFERENCE TO RELATED APPLICATIONS

This application is a continuation of and claims priority under 35 USC §120 to U.S. application Ser. No. 13/658,570, entitled "Providing Posts from an Extended Network," filed Oct. 23, 2012, which claims priority under 35 USC §119(e) to U.S. Application Ser. No. 61/576,067, entitled "Providing Posts from an Extended Network," filed Dec. 15, 2011, the entireties of which are herein incorporated by reference.

BACKGROUND

The present disclosure relates to social networks and the presentation of content. In particular, the present disclosure relates to finding and providing engaging posts from an extended network of a user.

The popularity and use of social networks have grown dramatically in recent years. In particular, social networks have become a very popular and a preferred method for interaction with others. However, for some users, the amount of content provided to them may be limited because of their use of the social network, their social graph or other factors. Users may not be using the social network to its full functionality because of a lack of knowledge, not providing interests or data, or various other factors. When the stream content becomes limited, users may leave the social network or use it less frequently or not all.

SUMMARY

According to one innovative aspect of the subject matter described in this disclosure, a system for finding and providing posts from an extended social network of a user is described. The system includes a processor, and a memory storing instructions that, when executed, cause the processor to retrieve a social graph of a user; determine other users that are more than one hop away from the user in the social graph; retrieve as extended posts from an extended social network one or more posts by the other users; rank the extended posts by relevance to the user; and provide one or more of the ranked posts.

In general, another innovative aspect of the subject matter described in this disclosure may be embodied in methods that include retrieving a social graph of a user; determining other users that are more than one hop away from the user in the social graph; retrieving as extended posts from an extended social network one or more posts by the other users; ranking the extended posts by relevance to the user; and providing one or more of the ranked posts.

Other aspects include corresponding methods, systems, apparatuses, and computer program products for these and other innovative aspects.

These and other implementations may each optionally include one or more of the following features. For instance, the features include: obtaining engaging posts from a network service; adding the engaging posts and the extended posts to create a combined list of added posts; and wherein ranking the extended posts by relevance to the user includes ranking the added posts. The features may also include: ranking the extended posts by a prediction of engagement by the user; ranking the extended posts by a social vicinity of an author of a post to the user; retrieving as extended posts including limiting the extended posts to posts that have been recently posted within a predetermined amount of time; and determining other users that are k hops away from the user in the social graph, where k is a natural number 2 or greater. For instance, the operations further include determining quality of the extended posts; adding approximately the same number of engaging posts and extended posts to the combined list of added posts if the quality of the extended posts is not high; and adding more extended posts than engaging posts to the combined list of added posts if the quality of the extended posts is high.

The present disclosure may be particularly advantageous in a number of respects. First, the engagement module may provide additional content to the user so he or she is more engaged with the social network. Second, the engagement module may provide information about the relationship of the content to the social graph of the user to engage the user and indicate why a particular post is provided. Third, the engagement module may make the user experience more enjoyable, thereby extending the time duration of each engagement as well as increasing the likelihood that the user will engage with the social network in the future. It should be understood that the present disclosure does not provide all implementations of the engagement module, and that in some implementations, the engagement module may be part of other modules, may be combined with other modules, or the functionality of the engagement module may be divided into smaller modules that in turn can be combined with other modules.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
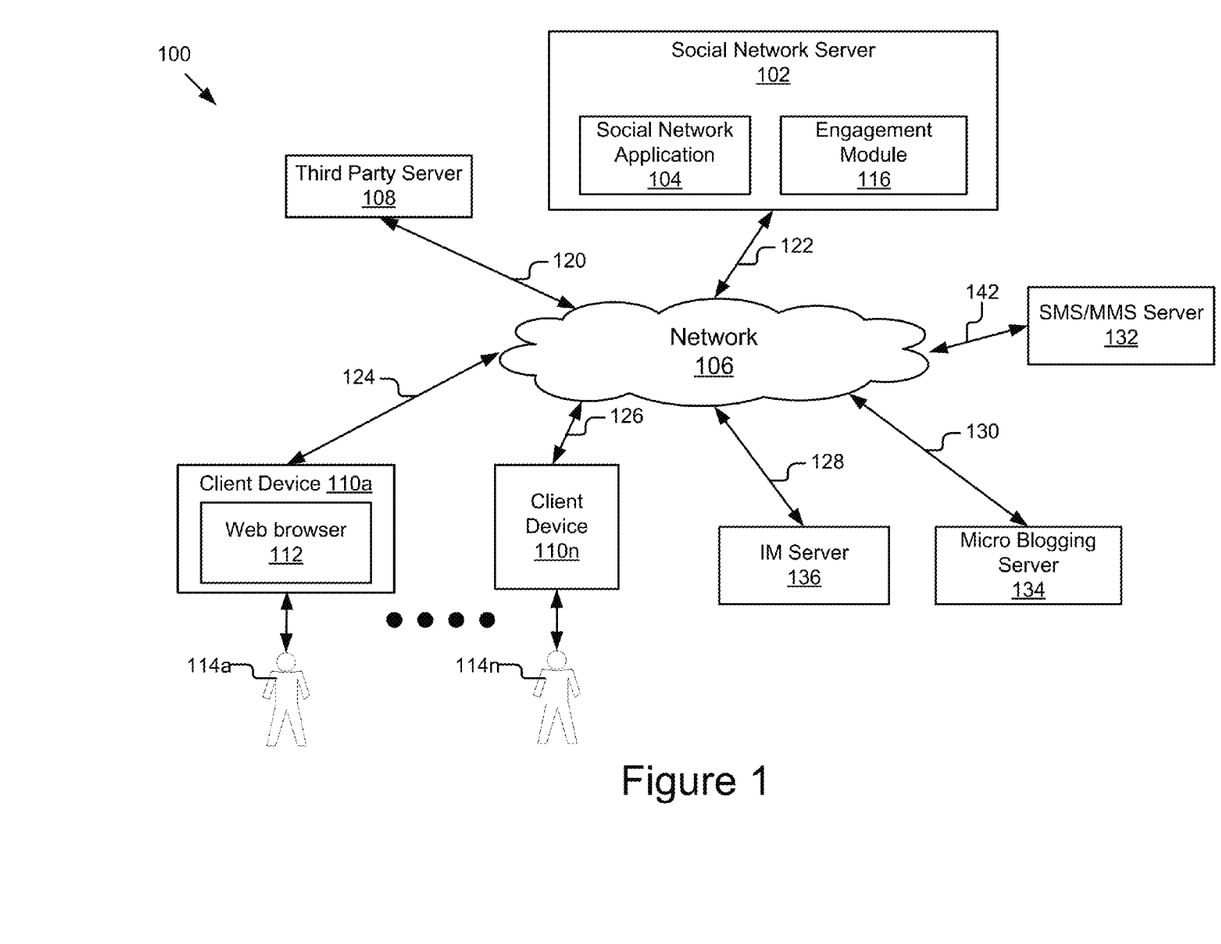
FIG. 1 is a block diagram illustrating an example of a system for finding and displaying engaging posts from an extended network.

FIG. 1 illustrates a block diagram of some implementations of a system 100 for finding and providing engaging posts from an extended social network of a user. The illustrated system 100 for finding and providing engaging posts includes a social network server 102 having a social network application 104 and an engagement module 116, a network 106, a third party server 108, one or more client devices 110a-110n (also referred to herein individually and collectively as 110) that are accessed by users 114a-114n (also referred to herein individually and collectively as 114), a Short Message Service (SMS)/Multimedia Messaging Service (MMS) server 132, a micro blogging server 134 and an instant message (IM) server 136. In the illustrated implementation, these entities are communicatively coupled via the network 106. Although only two client devices 110 are illustrated, it should be understood that any numbers of client devices 110 are available to any number of users 114. Moreover, while the present disclosure is described below primarily in the context of finding and providing posts for a stream of content in a social network, the present disclosure is applicable to improving user engagement with other systems and data.

The client devices 110a, 110n in FIG. 1 are used by way of example. While FIG. 1 illustrates two client devices 110, the present disclosure applies to any system architecture having one or more client devices 110. Furthermore, while only one network 106 is coupled to the social network server 102, the third party server 108, the client devices 110a, 110n, the SMS/MMS sever 132, the micro blogging server 134 and the IM server 136, in practice any number of networks 106 can be connected to the entities. Furthermore, while only one third party server 108 is shown, the system 100 could include one or more third party servers 108.

While shown as a stand-alone server in FIG. 1, in other implementations all or part of the social network server 102 could be part of the third party server 108 that is connected to the network 106. The social network server 102 interacts via signal line 122 and the network 106 with the third party server 108, client devices 110a-110n, the SMS/MMS sever 132, the micro blogging server 134 and the IM server 136. The social network server 102 includes the social network application 104 and the engagement module 116. The operation functionality of the engagement module 116 is described in more detail below with reference to FIGS. 2-5. The social network server 102 cooperates with the client device 110 to generate and present user interfaces for showing engaging posts from the extended social network of the user 114. The social network server 102 also obtains data from these other systems and components to determine information about a user's context, state and interests. The social network server 102 is also coupled for communication with the client device 110a, which is connected to the network 106 via signal line 124. The user 114a interacts with the client device 110a as represented by a signal line. Similarly, the client device 110n is coupled to the network 106 via signal line 126 and the user 114n interacts with the client device 110n as represented by a signal line. It should be understood that the social network server 102 can be stored in any combination of the devices and servers, or in only one of the devices or servers. The SMS/MMS server 132, the micro blogging server 134 and the IM server 136 are coupled to the network 106 by signal lines 142, 130 and 128, respectively for communication with the social network server 102.

In some implementations, the social network server 102, the third party server 108, the micro blogging server 134, the SMS/MMS server 132, and the IM server 136 are hardware servers that include a processor, a memory, and network communication capabilities.

The social network server 102 as noted above includes a social network application or software 104. Although only one social network server 102 is shown, it should be understood that multiple servers may be present. A social network is any type of social structure where the users are connected by a common feature. The common feature includes friendship, family, work, an interest, etc. The common features are provided by one or more social networking systems including explicitly-defined relationships and relationships implied by social connections with other online users, where the relationships form a social graph 118 (see FIG. 2). In some examples, the social graph 118 can reflect a mapping of these users and how they are related.

Furthermore, it should be understood that the social network server 102 and the social network application 104 are representative of one social network and that there are multiple social networks coupled to the network 106, each having its own server, application and social graph. For example, a first social network is more directed to business networking, a second is more directed to or centered on academics, a third is more directed to local business, a fourth is directed to dating and others of general interest or a specific focus. In another implementation (not shown), the engagement module 116 is stored on a third party server 108, which is connected to the network 106 via signal line 120. In yet another implementation, the engagement module 116 is stored on a client device 110a, 110n, which is connected to the network 106 via signal line 124, 126. It should be understood that the engagement module 116 can be stored in any combination on the devices and servers.

The network 106 can be wired or wireless, and may have any number of configurations including a star configuration, token ring configuration or other configurations. Furthermore, the network 106 may include a local area network (LAN), a wide area network (WAN) (e.g., the Internet), and/or any other interconnected data path across which multiple devices may communicate. In yet another implementation, the network 106 may be a peer-to-peer network. The network 106 may also be coupled to or includes portions of a telecommunications network for sending data in a variety of different communication protocols. In yet another implementation, the network 106 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
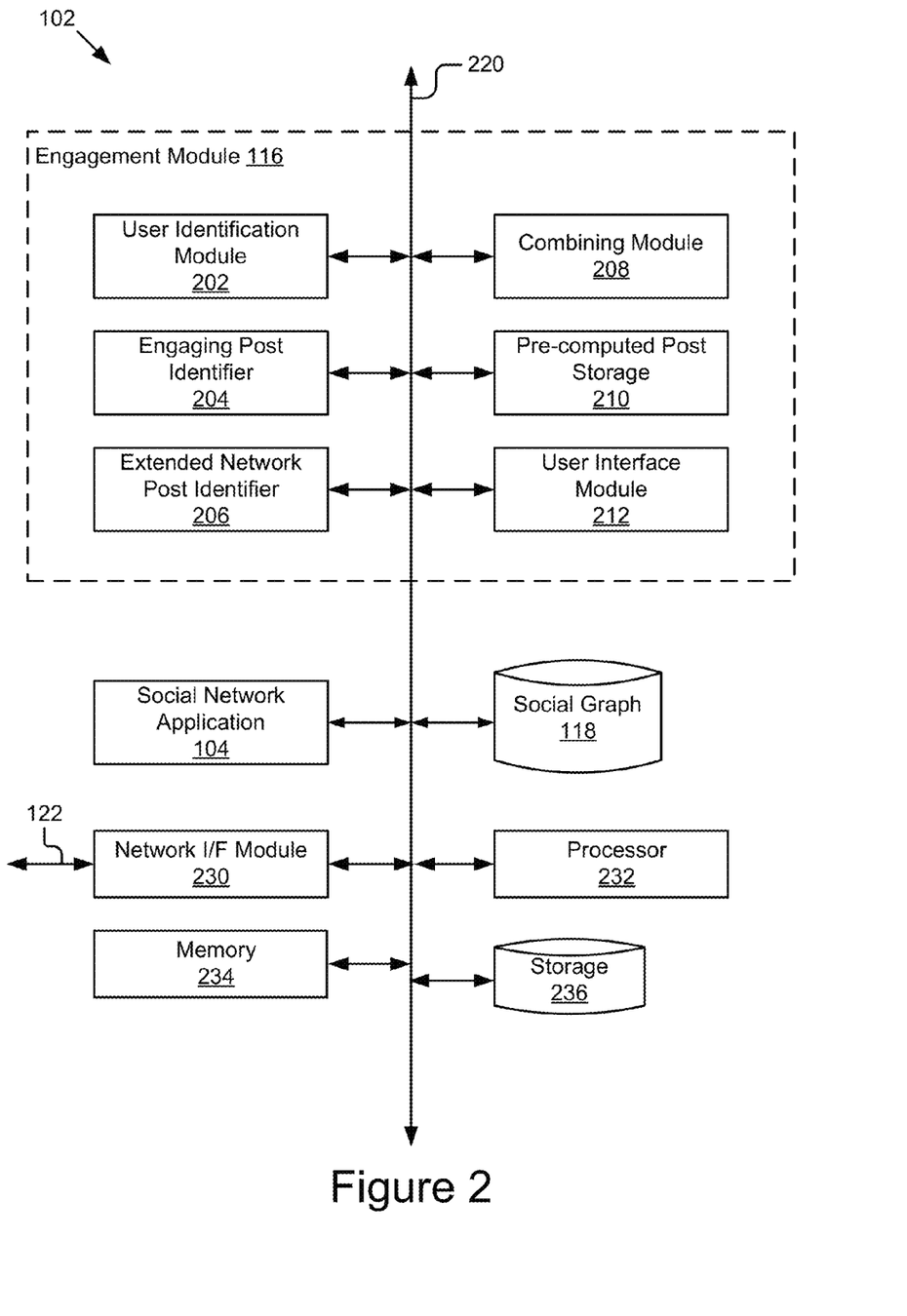
FIG. 2 is a block diagram illustrating an example of a social network server including an engagement module.

FIG. 2 is a block diagram of some implementations of the social network server 102. In this implementation, the social network server 102 includes: a network interface (I/F) module 230, a processor 232, a memory 234, a storage 236, a social network application 104, a social graph 118 and the engagement module 116.

The network interface module 230 is coupled to the network 106 by signal line 122 and coupled to the bus 220. The network interface module 230 includes ports for wired connectivity including USB, SD, or CAT-5, etc. The network interface module 230 links the processor 232 to the network 106 that may in turn be coupled to other processing systems. The network interface module 230 provides other connections to the network 106 using network protocols including TCP/IP, HTTP, HTTPS or SMTP. In other implementations, the network interface module 230 includes a transceiver for sending and receiving signals using Wi-Fi, Bluetooth® or cellular communications for wireless communication.

The processor 232 includes an arithmetic logic unit, a microprocessor, a general-purpose controller or some other processor array to perform computations and provide electronic display signals to a display device. The processor 232 is coupled to the bus 220 for communication with the other components. Processor 232 processes data signals and may include various computing architectures including a complex instruction set computer (CISC) architecture, a reduced instruction set computer (RISC) architecture, or an architecture implementing a combination of instruction sets. Although only a single processor 232 is shown in FIG. 2, multiple processors 232 may be included. Other processors, operating systems, sensors, displays and physical configurations are possible.

The memory 234 stores instructions and/or data that may be executed by the processor 232. The memory 234 is coupled to the bus 220 for communication with the other components. The instructions and/or data may include code for performing any and/or all of the techniques described herein. The memory 234 may be a dynamic random access memory (DRAM) device, a static random access memory (SRAM) device, flash memory or some other memory device.

In some implementations, the storage 236 stores data, information and instructions used by the social network server 102. Such stored information includes information about users, messages, posts, photos, and other information. The storage 236 may be a non-volatile memory or similar permanent storage device and media, for example, a hard disk drive, a floppy disk drive, a CD ROM device, a DVD ROM device, a DVD RAM device, a DVD RW device, a flash memory device, or some other mass storage device for storing information on a more permanent basis. The storage 236 is coupled by the bus 220 for communication with other components 116, 202, 204, 206, 208, 210, 212, 104, 118, 230, 232 and 234 of the social network server 102.

The social network application 104 can be software or routines operational on the social network server 102 for implementing a social network structure as has been described above. The social network application 104 maintains records of a user's interests, friends, and provides an area in which to post messages, photos, videos and other content. The social network application 104 also processes interactions with the social network and other systems. Using those interactions and information, the social network presents a stream of content that is tailored to the interests of the user. This stream of content can include messages, photos, videos web pages and other content from other users and friends of the user. The social network application 104 is coupled to the bus 220 for communication with the network interface module 230, the processor 232, the memory 234, the storage 236 and the engagement module 116.

Still referring to FIG. 2, the engagement module 116 is shown in greater detail. The engagement module 116 includes a user identification module 202, an engaging post identifier 204, an extended network post identifier 206, a combining module 208, a pre-computed post storage 210, and a user interface module 212. One function of the engagement module 116 is to identify or find content that will engage the user with the social network and provide that content to the user. These components 202, 204, 206, 208, 210 and 212 are coupled to the bus 220 for communication with each other and the other components 104, 118, 230, 232, 234 and 236 of the social network server 102. The bus 220 can be any type of communication bus. The operation of these modules 202, 204, 206, 208, 210 and 212 will be described in more detail below with reference to FIGS. 3-6.

The user identification module 202 can be software, code or routines for identifying a user for which content is being discovered and provided. The user identification module 202 exchanges information with the browser 112 of the client 110 to determine a user name of the user 114. In some implementations, various different types of authentication may be used to identify the user including passwords, cookies, ownership factors and knowledge factors. The user identification module 202 identifies a user of the social network and provides user identification information. In some implementations, the user identification information is provided by the user identification module 202 to the engaging post identifier 204 and the extended network post identifier 206. The user identification module 202 is coupled by the bus 220 for communication and interaction with the other modules 204, 206, 208, 210 and 212 of the engagement module 116.

The engaging post identifier or identification module 204 can be software, code or routines for identifying an engaging post or message that can be inserted into the content stream of the user. Engaging posts are comments or messages that are likely to engage the user and are about topics or categories of interest to the user, from other users in the social graph of the user and are ranked by quality of the post, trends of post, strength of relationship between the user and the poster, popularity and other factors. In some implementations, the engaging post identifier 204 identifies engaging posts from public posts already created by users and available on the social network. In some implementations, the engaging post identifier 204 is coupled by bus 220 and network interface module 230 to the public Internet and other social networks. The public Internet and these other third-party social networks are generally referred to in this application as "network services" and can be sources for retrieving engaging posts or other information that may be used by the engaging post identifier 204. It should be understood that the engaging post identifier 204 only uses public information or information provided according to the agreed terms of service of the other third-party social networks. The engaging post identifier 204 generates messages to extend the user's engagement with the content stream. The engaging post identifier 204 extends the user's engagement with the content stream by generating messages that are entertaining, informative, interesting to the user, fun, require the user to take action, related to other people known to the user, etc.

In some implementations, the engaging post identifier 204 generates messages that ask the user to share something. For example, a message is posted to: 1) encourage users to create a specific piece of content and share it with a hashtag. Clicking the hashtag takes you to search for the hashtag, with original message pinned to the top. These messages can be about the user's favorite drink, a hat, making a letter with your body, planking, owling, eating something, your favorite place. These messages can have themes, e.g., holiday themes July 4th: with an American flag, October 31st: with your Halloween costume; 2) encourage the user to find and post a video; 3) encourage the user to re-share information identifying chain emails; 4) create new groups of friends using your existing social graph, e.g., taking your most relevant friends and creating a new group or circle; 5) share web comics with suggestions; 6) change to your profile or profile picture with suggestions; or 7) check in from a specified location.

In some implementations, the engaging post identifier 204 generates messages that are whimsical and fun. For example, the message is: 1) a daily fortune; 2) a different cat video each time; 3) a fun fact; 4) a game; or 5) a doodle or image; etc.

In some implementations, the engaging post identifier 204 generates messages that are informational. For example, the message includes information about: 1) trending hashtags; 2) social graph posts; 3) one year ago today; 4) webpage article of the day; or 5) six of your friends uploaded new albums; etc.

In some implementations, the engaging post identifier 204 generates messages that are promotional including: 1) offer for free items; 2) introduction to a new service; 3) discounts on goods or services; or 4) complete survey for a gift; etc.

In some implementations, the engaging post identifier 204 generates a message that introduces new functionality of the social network application.

In some implementations, the engaging post identifier 204 generates an action the user can take on the social network including: adding people to their network, uploading photos, tagging photos, identifying the most popular post on the network or an amount of the user's friends, etc.

In some implementations, the engaging post identifier 204 generates a message that includes a link or transitions to another web page, game or other system.

In some implementations, the engaging post identifier 204 identifies content and then includes it as part of a message. For example, the engaging post identifier 204 creates engaging content by performing one or more from the group of: identifying engaging content; identifying content that has a score over a predefined threshold for likelihood of user engagement; identifying content that has frequent views; identifying content that has frequent shares, and identifying content that is spreading on a network virally, e.g., has a frequency of shares exceeding a threshold value. Once engaging content has been identified, the engaging post identifier 204 includes that engaging content or a portion of it in a message or references the engaging content in a post.

Finally, some implementations can be a combination of one or more of the above implementations in which information from the social network application 104 is used to determine the type of message to create to engage the user. The engaging post identifier 204 is coupled by the bus 220 for communication and interaction with the other modules 202, 206, 208, 210 and 212 of the engagement module 116.

The extended network post identifier or identification module 206 can be software, code or routines for identifying and retrieving content or post from the social network of the user. In some implementations, the extended network post identifier 206 identifies other users that are a predetermined number of hops away from the user, and identifies and retrieves content that is of relevance to the user. One example of the operation of the extended network post identifier 206 is described in more detail below with reference to FIG. 4. In some implementations, the extended network post identifier 206 receives the identity of the user from the user identification module 202 and outputs relevant posts that are sent to the combining module 208. The extended network post identifier 206 is coupled to the bus 220 for communication or interaction with the user identification module 202 and the combining module 208.

The combining module 208 can be software, code or routines for adding the engaging posts and the relevant posts to create a combined list of added posts. The combining module 208 is coupled to receive the engaging posts from the engaging post identifier 204. The combining module 208 is also coupled to receive relevant posts from the extended network post identifier 206. The combining module 208 combines these posts to create a list of added posts. In some implementations, the combining module 208 also ranks the added posts in an order of relevance to the user. One example for operation of the combining module 208 is described below with reference to FIG. 5. The combining module 208 is coupled for communication or interaction with the engaging post identifier 204, the extended network post identifier 206, the pre-computed post storage 210 and the user interface module 212.

The pre-computed post storage 210 can be storage for storing lists of added posts for users. In some implementations, the engagement module 116 pre-computes the list of added posts for a particular user and stores the pre-computed list in the pre-computed post storage 210. This is advantageous because it increases the speed at which the added posts may be presented to the user (serving speed). The pre-computed post storage 210 may be a non-volatile memory or similar permanent storage device and media as has been described above.

The user interface module 212 can be software, code or routines for presenting or formatting information for presentation to the user. For example, the user interface module 212 cooperates with the web browser 112 on the client device 110 to generate the displays of the present disclosure. One example of a user interface generated by the user interface module 212 will be described in more detail below with reference to FIG. 6. The user interface module 212 cooperates with the user identification module 202 to retrieve posted comments that are likely to be of interest to the user. In some implementations, the user interface module 212 retrieves posts found for the user from the pre-computed post storage 210. In some implementations, the user interface module 212 cooperates with the combining module 208 to receive posts found for the user. The user interface module 212 is coupled for communication with the combining module 208, the pre-computed post storage 210 and the client devices 110.

One or more of the user identification module 202, the engaging post identifier 204, the extended network post identifier 206, the combining module 208, the pre-computed post storage 210, and the user interface module 212 are executable on the processor 232; store data that, when executed by the processor 232, causes the collectors/modules to perform the operations described herein; are instructions executable by the processor 232 to provide the functionality described herein; or are stored in the memory 234 of the social network server 102 and are accessible and executable by the processor 232.

Figure 3:
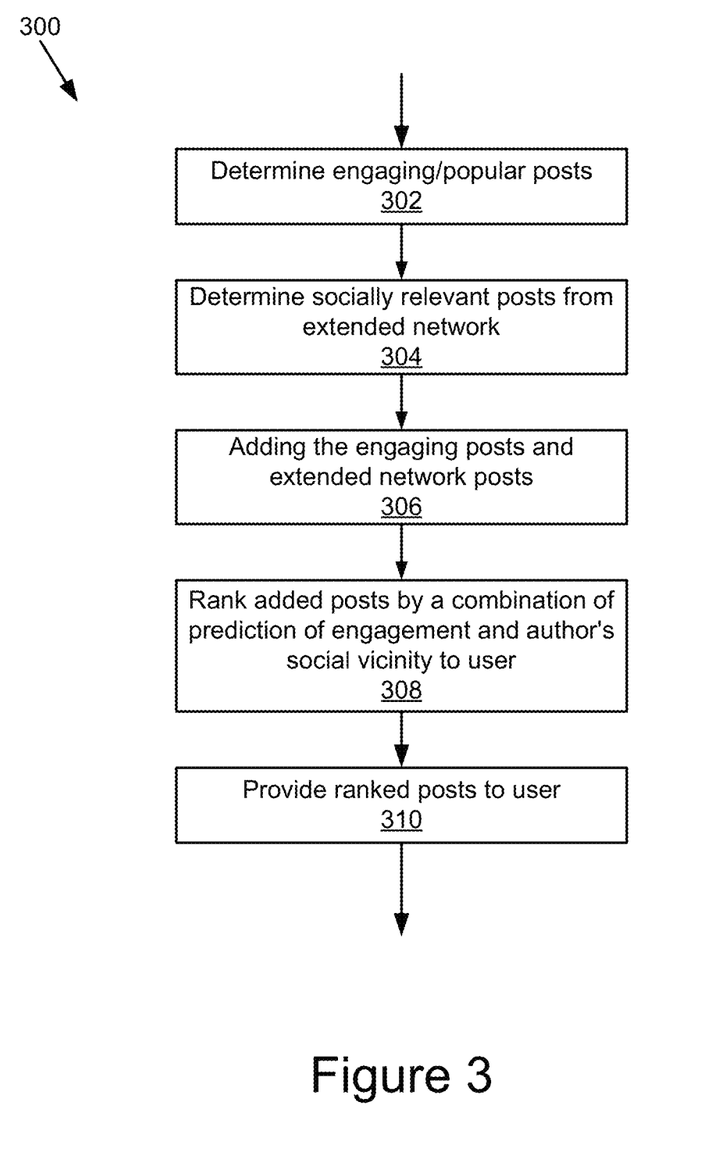
FIG. 3 is a flowchart of an example method for finding and providing engaging posts from an extended network.

Referring now to FIG. 3, an example of a method 300 for finding and providing engaging posts from an extended social network of a user is described. The method 300 begins by determining 302 engaging or popular posts from a network service. For example, as described above, the engaging post identifier 204 identifies or retrieves one or more comments, posts or content that may be of interest to the user. Such content may include posts by celebrities, thought leaders, popular personalities, etc. In some implementations, the "network services" may be the public Internet, other third-party social networks or any other source of sources for retrieving engaging posts or other information that may be used by the engaging post identifier 204. It should be understood that the engaging or popular posts are only determined from public information or information provided according to the agreed terms of service of the other third-party social networks or sources. The method 300 continues by determining 304 socially relevant posts from the extended network of the user. One example of a process for determining 304 socially relevant posts is described below in more detail with reference to FIG. 4. Next, the method 300 adds 306 the engaging posts from step 302 and the extended network posts from step 304. In some implementations, step 306 produces a combined list of added posts. The method 300 continues by ranking 308 the added posts based upon relevance to the user. In some implementations, the posts are ranked according to a prediction of engagement by the user. In some implementations, the posts are ranked by the social vicinity of the author of the post to the user. In some implementations, the posts are ranked by a combination of prediction of engagement, author's social vicinity or other factors. The method 300 completes by providing 310 ranked posts to the user. In some implementations, a predetermined number of the top ranked added posts are shown to the user. For example, a predetermined number of the top ranked added posts can be sent from the engaging module 116 and displayed on the web browser 112 of the client 110.

In some implementations, the method 300 may also include the additional step of increasing the diversity of posts shown to the user. For example, the posts provided to the user, independent of the ranking of the individual post, may be limited in number of posts by a particular author, on a particular topic, with particular features (like photo posts, or videos) or by middle men to reach the k-hop.

Figure 4:
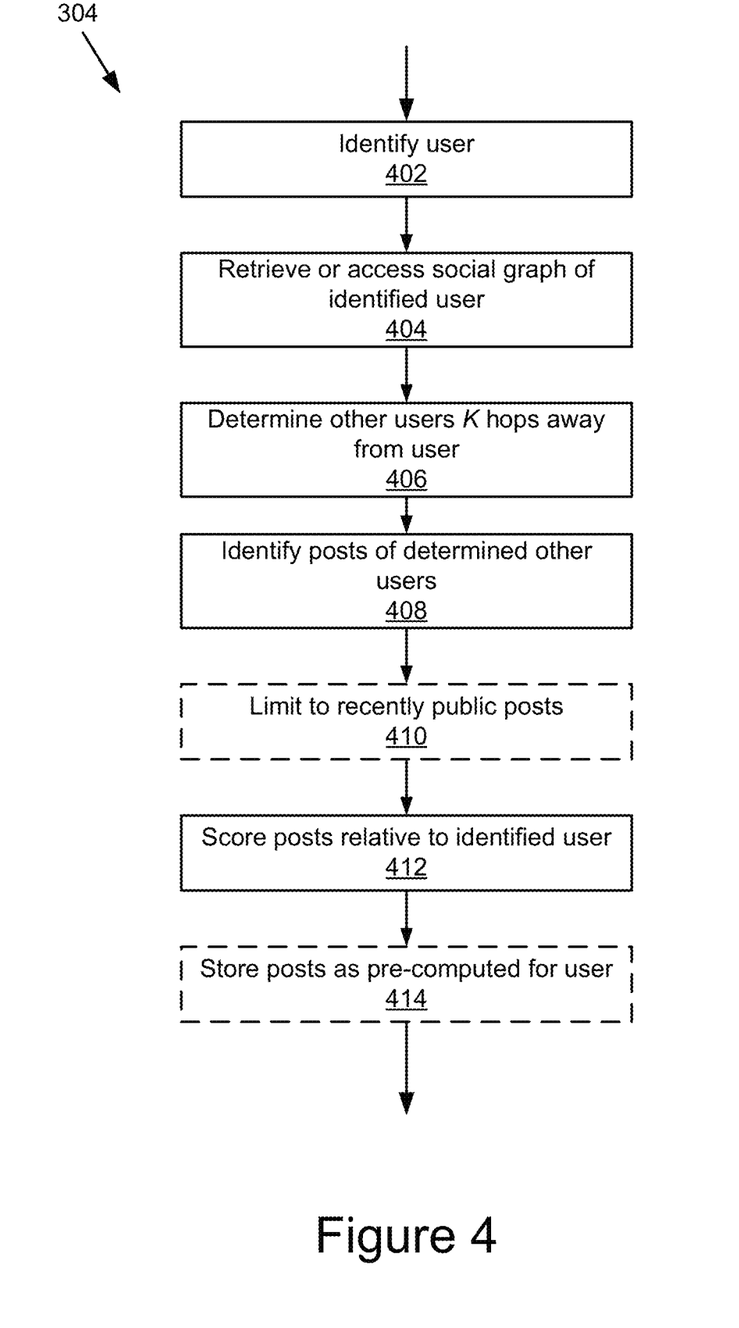
FIG. 4 is a flowchart of an example method for finding extended network posts.

FIG. 4 shows an example method 304 for finding extended network posts. The method 304 identifies 402 the user. In many cases, the user is logged into the social network and can be identified based upon their login. In some implementations, various types of other authentication methods may be used. The method 304 then retrieves or accesses 404 the social graph of the identified user. Then the method 304 determines 406 other users that are more than one hop away from the user in the social network. In some implementations, method 304 determines 406 other users that are k hops away from the user in the social network, where k is a natural number 2 or greater. In one example, k is equal to 2; however, it will be understood that k could have a variety of other values. For example, if user A is the identified user, user B is in the social graph of user A, user C is not in the social graph user A but is in the social graph of user B, then user C is considered to be two hops away from user A. The method 304 identifies 408 posts of the other users determined in step 406. In other words, for each member M of a potential user A's extended network, find M's public posts and display for user A. In some implementations, rather than determining other users k hops away, the method 304 determines users that are likely to co-occur with other users already in the user's social circle. In some implementations of the method 304, the identified posts are limited to those that have been recently publicly posted. For example, the posts may be limited to those that have been posted within the last hour, last few hours or within the last day. The method 304 then scores or ranks 412 the posts relative to the identified user. In some implementations, the method 304 scores the posts for each user by a variety of metrics. For example, the post may be scored based upon: 1) the strength of relationship between the poster and the user; 2) the quality of the post, including but not limited to the number of comments, shares, endorsements, or clicks on elements embedded in the post; 3) recency of the post; or 4) a combination of these factors. In some implementations, the method 304 optionally stores 414 the posts as pre-computed for the user. For example, the extended network post identifier 206 may store the scored, pre-computed posts for the user in the pre-computed post storage 210. It should be understood that in some implementations, a number of extended network posts are pre-computed for many numbers of users.

In some implementations, the method 304 is performed off-line for each user prior to the users accessing the system. Further, in some implementations, a Bloom filter of authors who have public posts is generated, and the Bloom filter is used to speed up the process of generating extended network posts by avoiding lookups for authors who are known not to have any public posts based on their absence in the Bloom filter.

In instances where a new user is signing up, this may automatically trigger a precomputation of recommendations for that user so that by the time the user is finished with the sign-up process, the extended network recommendations are available to that user.

Figure 5:
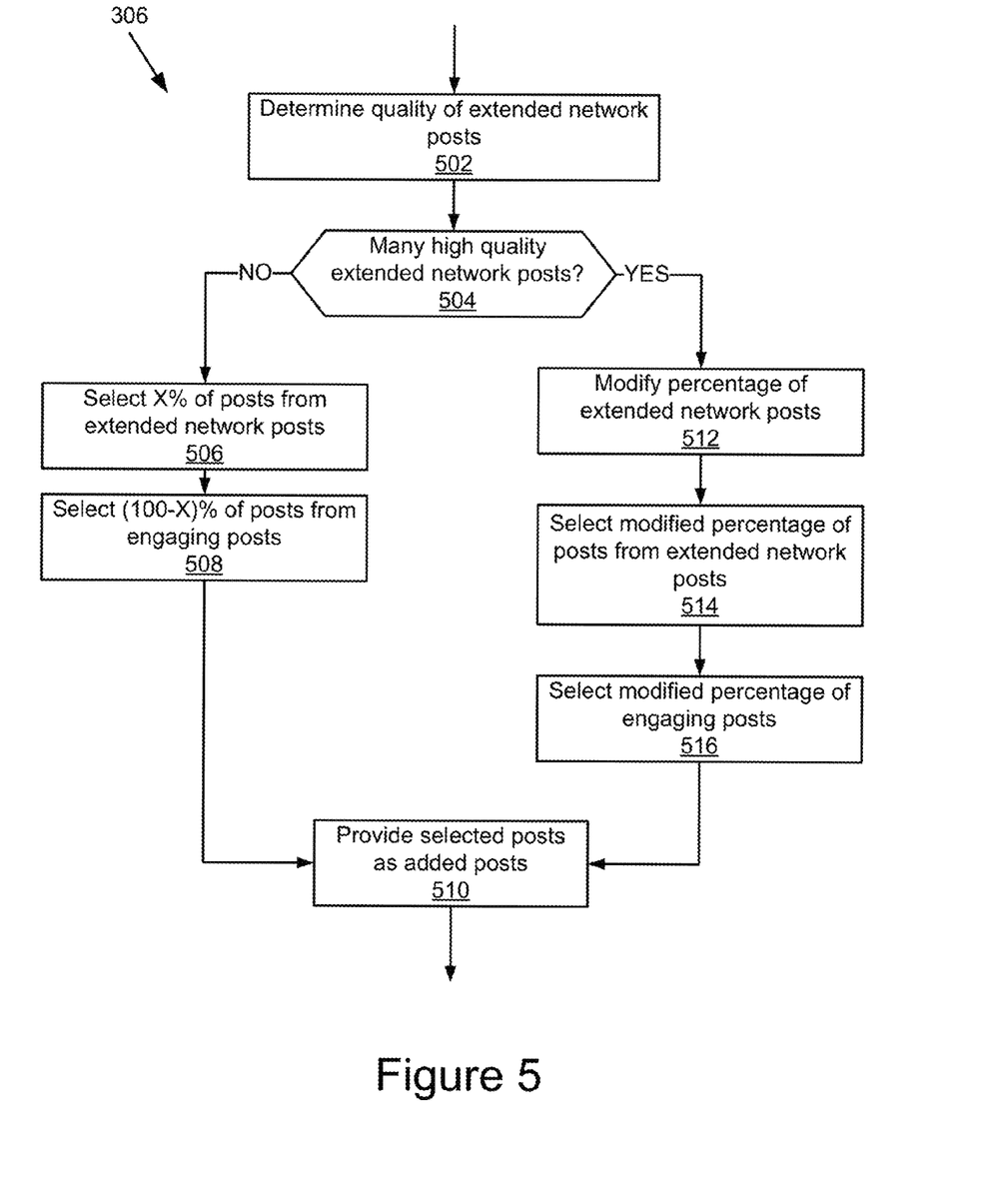
FIG. 5 is a flowchart of an example method for merging engaging posts and extended network posts.

FIG. 5 shows an example method 306 for adding engaging posts and extended network posts to create a combined list of added posts. The method 306 begins by determining 502 the quality of the extended network posts. Quality of the posts may be based upon strength of relationship, friendship, content in the post, importance of the topic to the user, or various other factors. The method 306 determines 504 whether there are many high-quality extended network posts. Determining whether there are many high-quality extended network posts may be done relative to the number of total posts that are going to be presented to the user, e.g., a ratio exceeding a threshold. For example, if eight posts are going to be presented to the user and there are only two high-quality posts, there are not many high-quality posts. On the other hand, if eight posts are going to be presented to the user and there are 16 high-quality posts, there are many high-quality posts. The threshold used to determine whether there are many high-quality posts may be preset, may be dynamically adjustable, or may be modified based on various factors. If in step 504 the method 306 determined that there were not many high-quality extended network posts, the method 306 selects 506 X percent of the posts from extended network posts, where X is an integer. Then the method 306 selects 508 100-X percent of the posts from engaging posts. The selected posts are then provided 510 as the added posts. Varying percentages for X may be used. For example, the default percentage may be an equal mix of 50% of extended network posts and engaging posts or a mix of 25% of extended network posts and 75% of engaging posts. If in step 504 the method 306 determined that there were many high-quality extended network posts, the method 306 continues in step 512. In step 512, the method 306 modifies (e.g., increases) the percentage of extended network posts. For example, if the default is that 50% of the posts are extended network posts and 50% of the posts are engaging posts, these percentages may be modified such that 75% of the posts are extended network posts and 25% are engaging posts. It should be understood that the modification of the percentage of extended network posts in some implementations may be tied to the number of high-quality extended network posts. The method 306 continues by selecting 514 the modified percentage of extended network posts and selecting 516 a modified (e.g., reduced) percentage of engaging posts. After step 516, the method 306 continues to provide 510 the selected posts as added posts.

In some implementations, the user is shown a subset of possible recommendations or posts that is gradually changing over time for the user. The presentation of posts can be designed so that it feels stable and the posts presented may not be changed more than every several minutes (e.g., more than 15 minutes), but also is not boring and at least one new posts is added on a similar interval (e.g., more than 15 minutes) for presentation. In some implementations, the expected time shown is proportional to the post score. For example, if the user checks the extended network posts every few minutes, the user will not see any change in the posts that are included. On the other hand, if the user checks the extended network posts every few hours, there may be slight changes in the posts that are presented to the user. As more time elapses between checking for recommended or found posts, the greater the likelihood that there will be different posts presented to the user.

Figure 6:
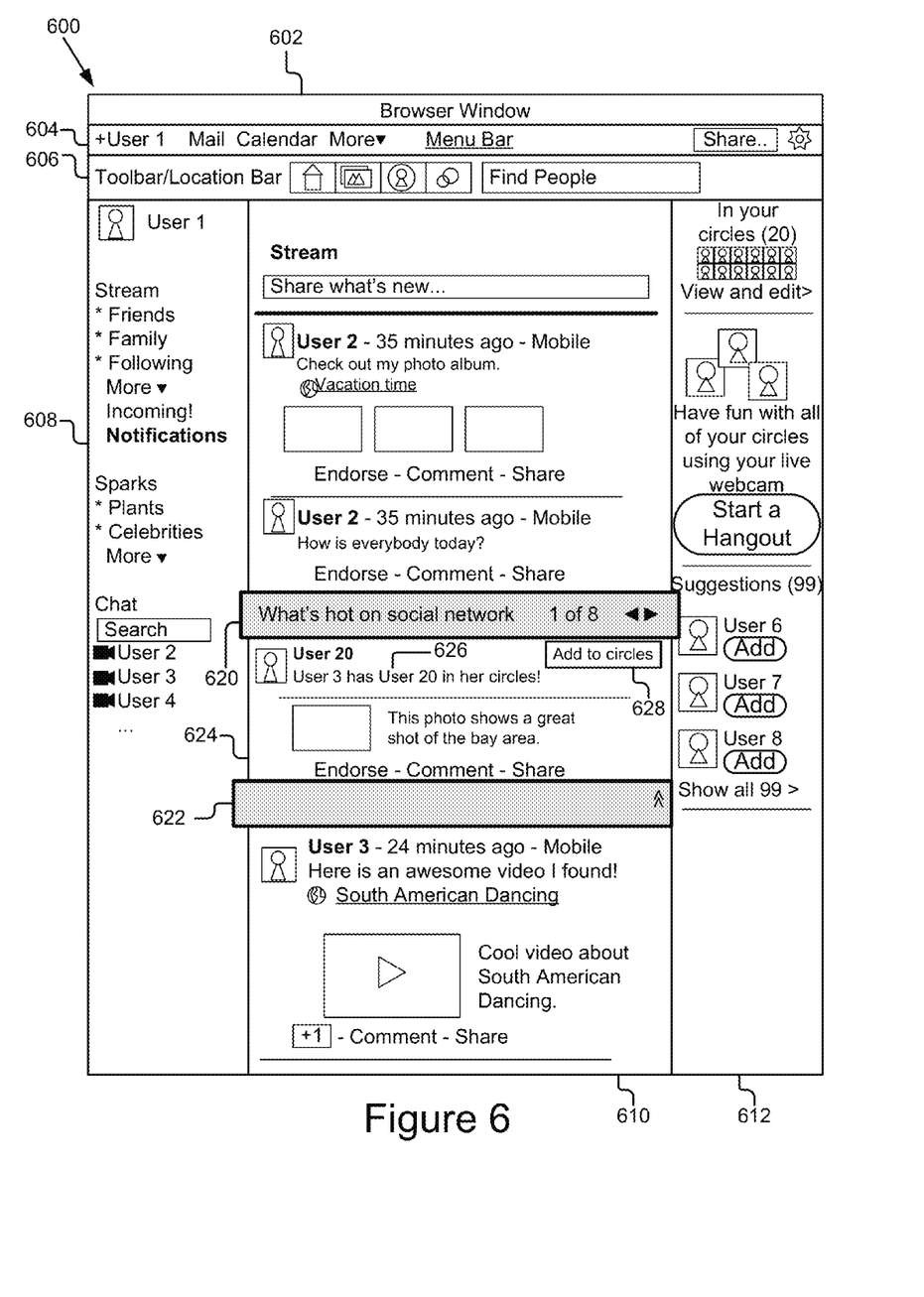
FIG. 6 is a graphic representation of an example user interface for displaying engaging posts from an extended network.

FIG. 6 is a graphic representation of an example user interface 600 for displaying engaging posts from an extended network. The user interface 600 includes a browser window 602 having a number of components including a menu bar 604, a tool bar 606, a left sidebar 608, a display area 610 and a right side bar 612. Although not shown, the user interface 600 may include various other components of a window, for example, an address bar, multiple tabs, etc. The menu bar 604 provides an area for user identification and menus for accessing other systems. The tool bar 606 provides icons for accessing different functions of a social network including a search box for finding other users. The left sidebar 608 provides a region for displaying a plurality of hypertext links to other streams, content feeds, notifications, chats and information about other user's on-line presence. The right side bar 612 includes other information about social networks, for example, groupings, video chat, and suggestions for other actions on the social network. The display area 610 of the user interface 600 includes a stream of several messages or posts. The messages are posts each including an identification of the author of the post, the time when was posted and the actual post or a digest of the post. Posts or messages can also include photos, videos or other files. Each post includes links to allow simple access for endorsement, commenting and sharing.

The user interface 600 shows the elements 620, 622, 624 for presenting extended network posts. The top bar 620, a display area 624 and the bottom bar 622 define a sub window in which extended network posts are provided and displayed to the user 1. The top bar 620 includes a label, "What's hot on social network," that indicates to the user that posts, messages or comments presented below are either engaging posts or posts from the extended network of the user 1. In this example, the number of posts that can be provided by the method of the present disclosure is limited to eight. The top bar 620 also specifies which post out of the eight that is being displayed in the display area 624. The top bar 620 also includes a series of buttons to advance or decrease the posts shown in the display area 624. The bottom bar 622 defines the boundary for the display area 624 of the user interface 600 that is used for presenting engaging posts. The bottom bar 622 includes a close button so that the posts that are not shown in the bars 620, 622 are minimized and the display area 624 is not shown. The display area 624 is defined between the top bar 620 and the bottom bar 622. In some implementations, the display area 624 shows a post that may have the attributes similar to any other post in the stream. In this example, the display area 624 is showing a post. The post includes information about the author of the post, photos, abstracted concepts, and links for endorsing, commenting or sharing. The display area 624 also includes a button 628 to add the author of the post to a circle of user 1. In this example, if the "add to circles" button 628 were selected, user 3 would be added to a circle of user 1. Since extended network posts are provided in the display area 624, an indication 626 of why the particular post is being presented to user 1 is provided. For example, in this example the author of the messages user 20 and the message is being provided because "User 3 has user 20 in her circles." This user interface 600 is particularly advantageous because engaging posts or posts from the extended network of the user can be injected into the stream of the user with clear demarcations that they are different from the normal post the user would see in their stream. Furthermore, the user interface 600 also provides mechanisms to see additional engaging posts or take action with regard to a post that is being displayed. It should be understood that this user interface 600 is merely an example of one way to present or provide engaging or extended network posts. The engaging or extended network posts may also be sent to the user via e-mail in other implementations.

Systems and methods for finding and providing engaging posts from an extended network of a user have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in some implementations below with reference to user interfaces and particular hardware. Moreover, the technologies are disclosed above primarily in the context of a social network server; however, the disclosed technologies apply to other data sources and other data types (e.g., collections of other resources, images, audio, web pages, etc.) that detect and extend user engagement with content.

Reference in the specification to "some implementations" or "an implementation" means that a particular feature, structure, or characteristic described in connection with the implementation is included in at least some implementations of the disclosed technologies. The appearances of the phrase "in some implementations" in various places in the specification are not necessarily all referring to the same implementation.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing," "computing," "calculating," "determining," "displaying," or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions and/or formats. Furthermore, the modules, routines, features, attributes, methodologies, and other aspects of the present disclosure can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
automatically retrieving extended content from other users that are a predetermined number of hops away from a user in an extended network of the user;
obtaining engaging content for the user from a network service to increase the user's engagement with a content stream by identifying the engaging content having a score over a predefined threshold for likelihood of user engagement based upon one or more of quality of posts, trends of posts, and strength of a relationship between the user and a poster, the obtaining engaging content including generating a message with an action button for the user to take an action in a social network;
combining the engaging content and the extended content to create a combined list of content;
ranking the combined content by relevance to the user; and
providing one or more of the ranked content.

2. The method of claim 1, wherein ranking the combined content includes ranking the extended content by a prediction of engagement by the user.

3. The method of claim 1, wherein ranking the combined content includes ranking the extended content by a vicinity of an author of content to the user.

4. The method of claim 1, further comprising:
retrieving a user relationship map for the user;
determining other users that are more than one hop away from the user in the user relationship map;
retrieving content by the other users as the extended content;
determining quality of the extended content; and
combining more extended content than engaging content to the combined list of content if the quality of the extended content is high.

5. The method of claim 4, wherein retrieving the content as the extended content includes limiting the extended content to the content that have been recently posted within a predetermined amount of time.

6. The method of claim 4, wherein determining the other users includes determining the other users that are k hops away from the user in the user relationship map, where k is a natural number 2 or greater.

7. The method of claim 4, wherein combining the engaging content and the extended content comprises:
combining approximately a same amount of engaging content and extended content to the combined list of content if the quality of the extended content is not high.

8. A computer program product comprising a non-transitory computer usable medium including a computer readable program, wherein the computer readable program when executed on a computer causes the computer to:
automatically retrieve extended content from other users that are a predetermined number of hops away from a user in an extended network of the user;

obtain engaging content for the user from a network service to increase the user's engagement with a content stream by identifying the engaging content having a score over a predefined threshold for likelihood of user engagement based upon one or more of quality of posts, trends of posts, and strength of a relationship between the user and a poster, the obtaining engaging content including generating a message with an action button for the user to take an action in a social network;

combine the engaging content and the extended content to create a combined list of content;

rank the combined content by relevance to the user; and provide one or more of the ranked content.

9. The computer program product of claim 8, wherein the combined content is ranked by a prediction of engagement by the user.

10. The computer program product of claim 8, wherein the combined content is ranked by a vicinity of an author of content to the user.

11. The computer program product of claim 8, wherein the computer readable program when executed on the computer causes the computer further to:

retrieve a user relationship map for the user;

determine other users that are more than one hop away from the user in the user relationship map;

retrieve content by the other users as the extended content;

determine quality of the extended content; and combine more extended content than engaging content to the combined list of content if the quality of the extended content is high.

12. The computer program product of claim 11, wherein the retrieval of content is limited to the content that has been recently posted within a predetermined amount of time.

13. The computer program product of claim 11, wherein the determination of other users includes determining the other users that are k hops away from the user in the user relationship map, where k is a natural number 2 or greater.

14. The computer program product of claim 11, wherein the computer readable program when executed on the computer causes the computer to also:

combine approximately a same amount of engaging content and extended content to the combined list of content if the quality of the extended content is not high.

15. A system comprising:

one or more processors, and a memory storing instructions that, when executed, cause the system to:

automatically retrieve extended content from other users that are a predetermined number of hops away from a user in an extended network of the user;

obtain engaging content for the user from a network service to increase the user's engagement with a content stream by identifying the engaging content having a score over a predefined threshold for likelihood of user engagement based upon one or more of quality of posts, trends of posts, and strength of a relationship between the user and a poster, the obtaining engaging content including generating a message with an action button for the user to take an action in a social network;

combine the engaging content and the extended content to create a combined list of content;

rank the combined content by relevance to the user; and provide one or more of the ranked content.

16. The system of claim 15, wherein the combined content is ranked by a prediction of engagement by the user.

17. The system of claim 15, wherein the combined content is ranked by a vicinity of an author of content to the user.

18. The system of claim 15, wherein the system is further configured to:

retrieve a user relationship map of a user;

determine other users that are more than one hop away from the user in the user relationship map;

retrieve content by the other users as the extended content;

determine quality of the extended content; and combine more extended content than engaging content to the combined list of content if the quality of the extended content is high.

19. The system of claim 18, wherein the retrieval of content is limited to the content that has been recently posted within a predetermined amount of time.

20. The system of claim 18, wherein the determination of other users includes determining the other users that are k hops away from the user in the user relationship map, where k is a natural number 2 or greater.

21. The system of claim 18, wherein the system is further configured to:

combine approximately a same amount of engaging content and extended content to the combined list of content if the quality of the extended content is not high.

* * * * *